(12) United States Patent
Heinz et al.

(10) Patent No.: US 6,697,616 B1
(45) Date of Patent: Feb. 24, 2004

(54) METHOD AND BASE STATION FOR FUNCTIONAL TESTING OF A TRANSMISSION AND RECEPTION PATH

(75) Inventors: Helmut Heinz, Windach (DE); Holger Kunze, München (DE); Franz Schreib, München (DE); Jörg Monschau, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/433,385

(22) Filed: Nov. 3, 1999

(30) Foreign Application Priority Data

Nov. 3, 1998 (DE) .......................................... 198 50 654

(51) Int. Cl.$^7$ ................................................ H04Q 7/20
(52) U.S. Cl. ..................... 455/424; 455/67.11; 455/561; 455/115; 455/226.2
(58) Field of Search ......................... 455/522, 69, 67.1, 455/67.3, 67.4, 504, 505, 506, 67.6, 67.7, 65, 62, 63, 437, 452, 456, 436, 439, 423, 424, 425, 226.1, 226.2, 115, 67.11; 370/342, 335

(56) References Cited

U.S. PATENT DOCUMENTS

| | | | | |
|---|---|---|---|---|
| 5,361,402 A | * | 11/1994 | Grube et al. ............... | 455/67.1 |
| 5,603,096 A | * | 2/1997 | Gilhousen | |
| 5,822,318 A | * | 10/1998 | Tiedemann | |
| 6,023,621 A | * | 2/2000 | Jackson et al. ............. | 370/330 |
| 6,072,778 A | * | 6/2000 | Labedz et al. ............. | 370/252 |
| 6,167,240 A | * | 12/2000 | Carlsson | |
| 6,173,162 B1 | * | 1/2001 | Dahlman | |
| 6,175,745 B1 | * | 1/2001 | Bringby | |
| 6,253,060 B1 | * | 6/2001 | Komara et al. ............ | 455/11.1 |
| 6,269,250 B1 | * | 7/2001 | Bender | |
| 6,278,879 B1 | * | 8/2001 | Western et al. ............ | 370/331 |

FOREIGN PATENT DOCUMENTS

DE  196 44 965 A1  4/1998

* cited by examiner

*Primary Examiner*—Dwayne Bost
*Assistant Examiner*—Temica M. Davis
(74) *Attorney, Agent, or Firm*—Laurence A. Greenberg; Werner H. Stemer; Gregory L. Mayback

(57) ABSTRACT

A method for functional testing of a transmission and reception path includes transmitting a first signal at a first transmission power level to a radio station and determining a first reception strength, with a base station. A first difference value is subsequently calculated. The radio station transmits a second signal at a second transmission power level to the base station, determines a second reception strength, and calculates a second difference value. Any difference between the difference values is then compared with a threshold value, and a function of a transmission and reception path is derived from the comparison. A base station of a radio communications system is also provided.

11 Claims, 4 Drawing Sheets

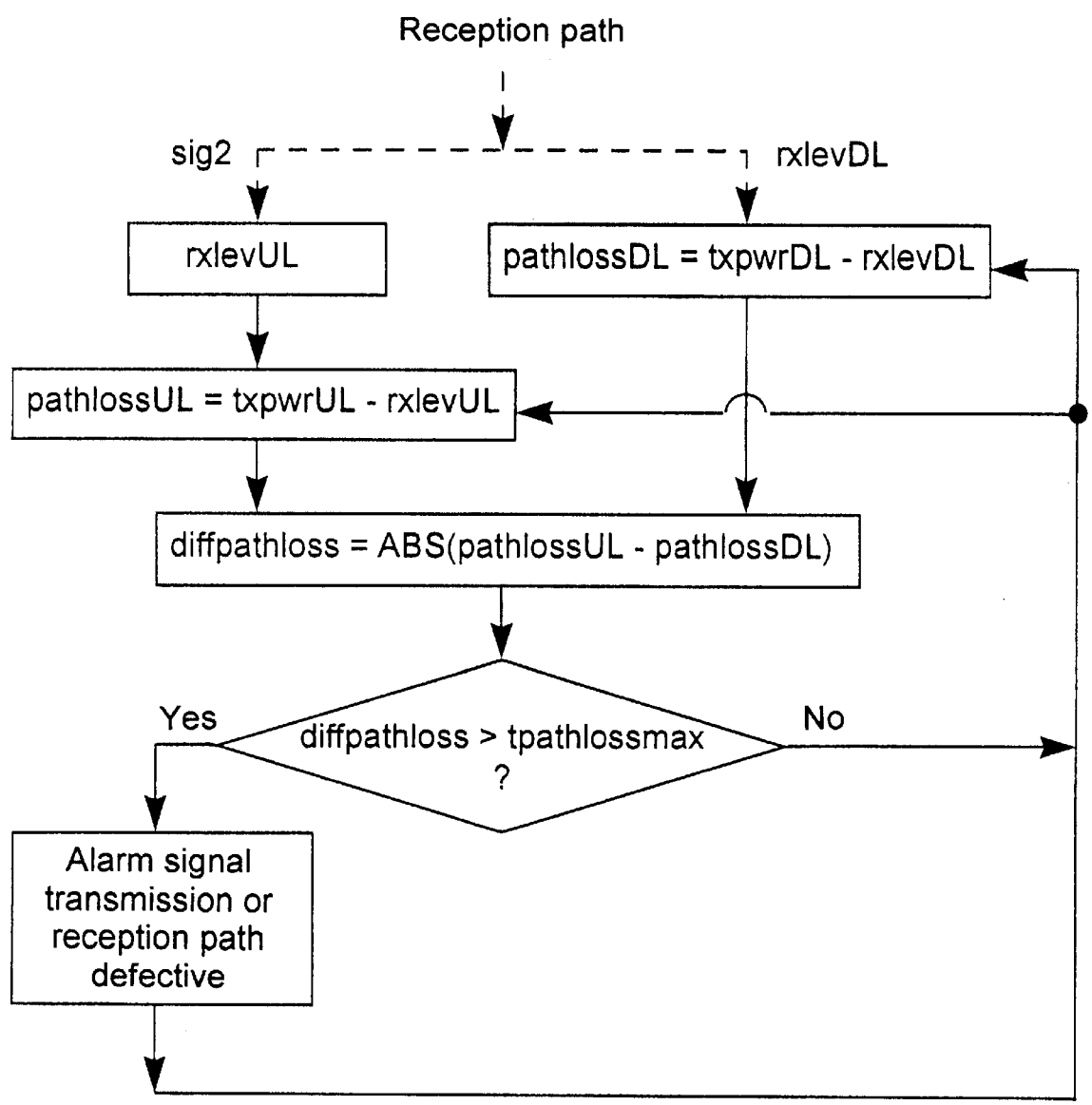

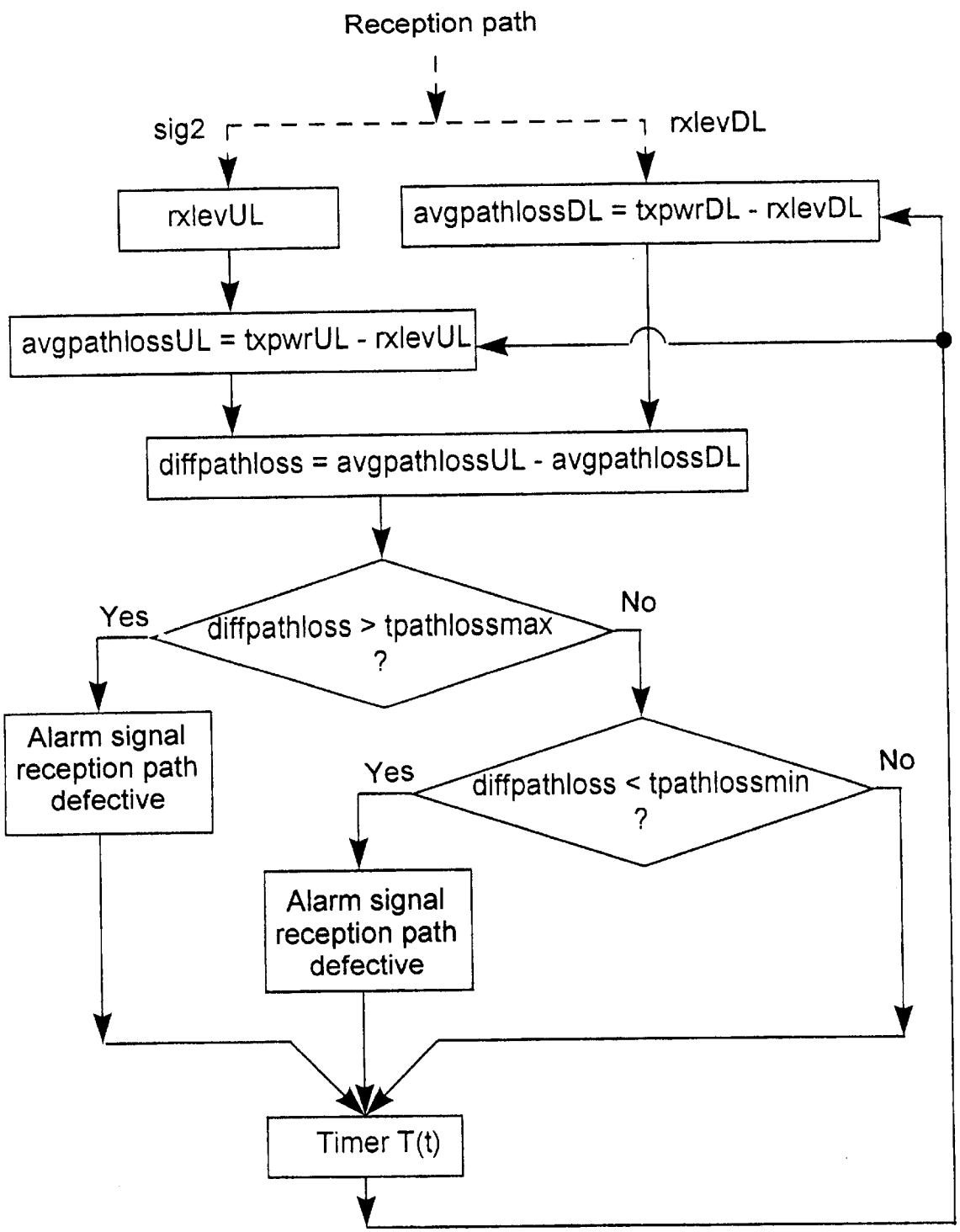

METHOD AND BASE STATION FOR FUNCTIONAL TESTING OF A TRANSMISSION AND RECEPTION PATH

BACKGROUND OF THE INVENTION

Field of the Invention

The invention relates to a method and a base station for functional testing of a transmission and reception path, in particular in a base station of a radio communications system.

In radio communications systems, information such as voice, video information or other data is transmitted through the use of electromagnetic waves through a radio interface between a transmitting and a receiving radio station, such as a base station, or a mobile station in the case of a mobile radio system. The electromagnetic waves in that case are emitted at carrier frequencies which are located in the frequency band provided for the respective system. In the case of the GSM mobile radio system (Global System for Mobile Communication), the carrier frequencies are in the region of 900 MHz, 1800 MHz and 1900 MHz. Carrier frequencies in the region of about 2000 MHz are envisaged for future mobile radio systems using CDMA and TD/CDMA transmission methods through the radio interface, such as the UMTS (Universal Mobile Telecommunication System) or other $3^{rd}$ generation systems.

According to the prior art, any malfunction or failure of a transmission or reception path of a transceiver in the base station of a mobile radio system can be detected only by testing the respective transmission and reception path when switched off. That is disadvantageous since the radio resources cannot be used during the time period for functional testing. Therefore, the test must be carried out, in particular, at times when the traffic level is low. Furthermore, the test must actually be carried out at the location of the base station, which disadvantageously involves a large amount of technical effort and a long time for the operator of the radio communications system if, for example, the base station is installed at a remote location.

SUMMARY OF THE INVENTION

It is accordingly an object of the invention to provide a method and a base station for simple functional testing of a transmission and reception path, which overcome the hereinafore-mentioned disadvantages of the heretofore-known methods and devices of this general type.

With the foregoing and other objects in view there is provided, in accordance with the invention, a method for functional testing of transmission and reception paths in a base station of a radio communications system, which comprises providing at least one transmitting/receiving device in the base station for transmitting and receiving signals through a radio interface to and from a radio station; transmitting a first signal at a first transmission power level from the base station to the radio station, determining a first reception strength of the first signal in the radio station, and calculating a first difference value between the first transmission power level and the first reception strength; transmitting a second signal at a second transmission power level from the radio station to the base station, determining a second reception strength of the second signal in the base station, and calculating a second difference value between the second transmission power level and the second reception strength; comparing any difference between the first difference value and the second difference value with at least one threshold value; and deriving a function of the transmission and reception path of the base station from the comparison.

The invention advantageously allows the function of the transmission and reception path to be determined by a simple comparison of determined difference values, which each provide a statement relating to the loss during transmission through the radio interface. This comparison can be carried out in normal operation of the base station, as a result of which there is advantageously no limitation on the radio resources for the functional testing. In this case, signaling information or wanted information can be transmitted, for example, as the signals. Furthermore, the invention advantageously allows the function of the transmission and reception paths to be determined continuously, so that it is possible to react quickly to any faults which occur.

In accordance with another mode of the invention, an alarm signal is generated when a malfunction of the transmission and reception path is determined. This allows, for example, advantageous central detection of the function of the respective transmitting/receiving devices of the base station in a central device of the radio communications system.

In accordance with a further mode of the invention, the difference between the determined difference values is compared with an upper and with a lower threshold value, and the respective function of the transmission or reception path is derived from the comparison. This advantageously makes it possible to determine whether the transmission path or the reception path has a malfunction or is defective.

In accordance with an added mode of the invention, an alarm signal, which indicates a malfunction of the transmission path or of the reception path, is generated in each case if the upper threshold value is overshot or the lower threshold value is undershot.

In accordance with an additional mode of the invention, the difference between the average values of the difference values is determined, in which case the average values are determined over a predetermined time interval. A determination of average values advantageously allows fluctuations in the difference values (caused, for example, by shadowing or other physical interference in the transmission through the radio interface) to be normalized and averaged. Therefore, it is advantageously possible to make a more accurate statement regarding the function of the transmission and reception path.

In accordance with yet another mode of the invention, the method is used in a radio communications system which uses a TDMA subscriber separation method or a combination of a TDMA method with further subscriber separation methods. A joint feature of these methods is parallel use of a frequency band for a plurality of communications links, with the individual links being distinguished by time slots. If combined with a CDMA subscriber separation, subscribers are additionally separated by a respective assignment to spread codes. In this case, the difference can advantageously be respectively determined on a frequency basis or a transmission/reception device basis.

With the objects of the invention in view there is also provided a base station of a radio communications system, comprising a transmitting/receiving device for transmitting a first signal at a first transmission power level to a radio station through a radio interface, and for receiving a second signal transmitted by the radio station at a specific second transmission power level; and a control device for determining a second reception strength of the received second signal, for calculating a first difference value between the first transmission power level and a first reception strength determined in the radio station, and for calculating a second difference value between the second transmission power level and the second reception strength, for comparing a difference between the first difference value and the second difference value with at least one threshold value, and for deriving a function of a transmission and reception path from the comparison.

In accordance with another feature of the invention, there is provided a timer for periodically stimulating the determination of the difference values at a predetermined time interval.

In accordance with a concomitant feature of the invention, the base station is a base station of a mobile radio system or of a wire-free subscriber access system.

Other features which are considered as characteristic for the invention are set forth in the appended claims.

Although the invention is illustrated and described herein as embodied in a method and a base station for functional testing of a transmission and reception path, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 4 is a flowchart of the method according to the invention; and

FIG. 5 is a flowchart of the method according to the invention, with average values additionally being determined.

DESCRIPTION OF THE PREFERRED EMBODIMENTS

Figure 1:
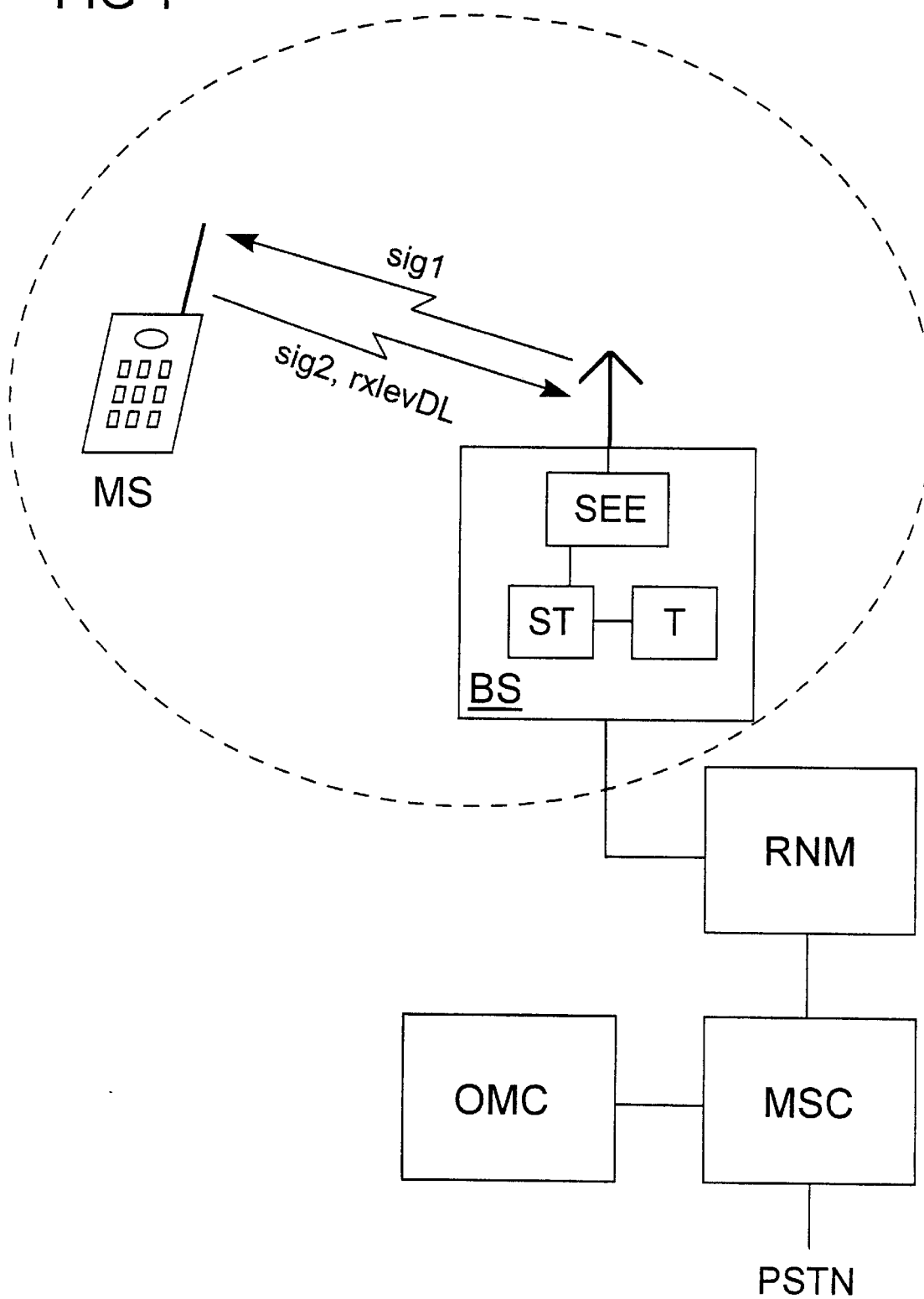
FIG. 1 is a block circuit diagram of a radio communications system, in particular of a mobile radio system.

Referring now to the figures of the drawings in detail and first, particularly, to FIG. 1 thereof, there is seen a radio communications system which is configured as a mobile radio system including a large number of mobile switching centers MSC that are networked with one another and/or produce access to a fixed network PSTN. The mobile switching centers MSC are each connected to an operation and maintenance center OMC, which allows central administration of functions relating to the radio communications system. Furthermore, these mobile switching centers MSC are each connected to at least one device RNM for assignment of radio resources. Each of these devices RNM in turn allows a link to be set up to at least one base station BS. Such a base station BS is a radio station which can set up links to other radio stations MS, for example mobile stations or stationary terminals, through a radio interface. Each base station BS forms at least one radio cell, with mobile stations located in its area being supplied with radio resources. If broken down into sectors, or if hierarchical cell structures are used, a number of radio cells can also be supplied by each base station BS. The functionality of the illustrated structure is used by the radio communications system according to the invention.

When a link is being set up or when a communications link already exists between the base station BS and the radio station MS, signals are transmitted through the radio interface. These signals may be signaling information or wanted information, such as voice information. Transmission power control is carried out in order to reduce interference in the radio communications system, and power consumption. In accordance with a known GSM mobile radio system, when a link is being set up, the radio station MS determines a required transmission power from a reception strength measurement of received signals in a general signaling channel (BCCH-Broadcast Control Channel) transmitted by the base station BS at a maximum transmission power level. Subsequently, the radio station MS transmits signals, for example for setting up a link, and information relating to the reception strength with which it has received the general signaling channel, at a specific transmission power level. Using this information, the base station BS in turn controls transmission power regulation for transmitting signals to the radio station MS. The base station BS then uses reception strength measurements on the signals transmitted by the radio station MS to control the transmission power regulation of the radio station MS at periodic intervals, using signaling information.

By way of example and in order to explain the invention, FIG. 1 shows the transmission of a first signal sig1 from the base station BS to the radio station MS, and the transmission of a second signal sig2 from the radio station MS to the base station BS. The radio station MS sends a value of a first reception strength rxlevDL determined from the received first signal sig1, in parallel with the second signal sig2. The base station BS has a transmitting/receiving device SEE, connected to an antenna device, for transmitting and receiving wanted and signaling information to and from the radio station MS. The received signals and information are fed to a control device ST according to the invention, in which various functions that are described with regard to FIG. 4 and FIG. 5 are carried out. In addition to the transmitting/receiving device SEE and the control device ST, the base station BS includes further components and devices such as a timer T, which is indicated as an example. The radio station MS has at least one non-illustrated transmitting/receiving device and a device for determining the first reception strength rxlevDL of the first signal sig1.

Figure 2:
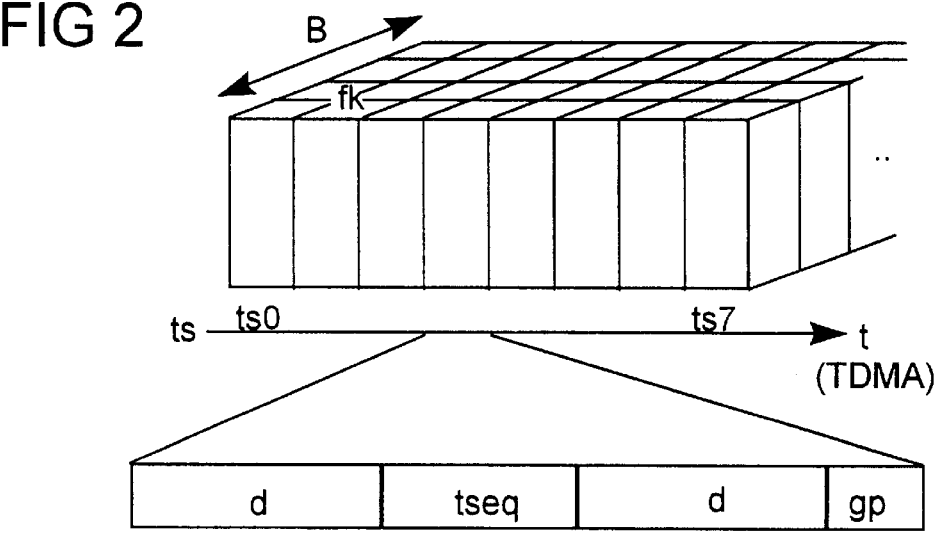
FIG. 2 is a diagrammatic, perspective illustration of an example of a frame structure of a radio interface for a TDMA subscriber separation method, and of a formation of a radio block.

FIG. 2 shows a frame structure of the radio interface, which corresponds to a known radio interface for a GSM mobile radio system. A broadband frequency range B, for example with a bandwidth B=1.6 MHz, is split in accordance with an FDMA component into a plurality of frequency channels fk, for example eight frequency channels each having a bandwidth of 200 kHz. Furthermore, there is a split into time slots ts, for example eight time slots ts0 to ts7, in accordance with a TDMA component. Each time slot ts within a frequency channel fk forms a physical transmission channel. The successive time slots ts are broken down in accordance with a frame structure so that eight time slots ts0 to ts7 are combined to form a time frame tf.

Information from a plurality of calls is transmitted at separate times in radio blocks within the frequency channels fk which are provided for wanted data transmission. These radio blocks include sections with data d, in each of which sections are embedded having training sequences tseq that are known at the receiving end. Furthermore, a guard time gp is provided within the time slot ts, in order to compensate for different signal propagation times for the calls in successive time slots ts.

Figure 3:
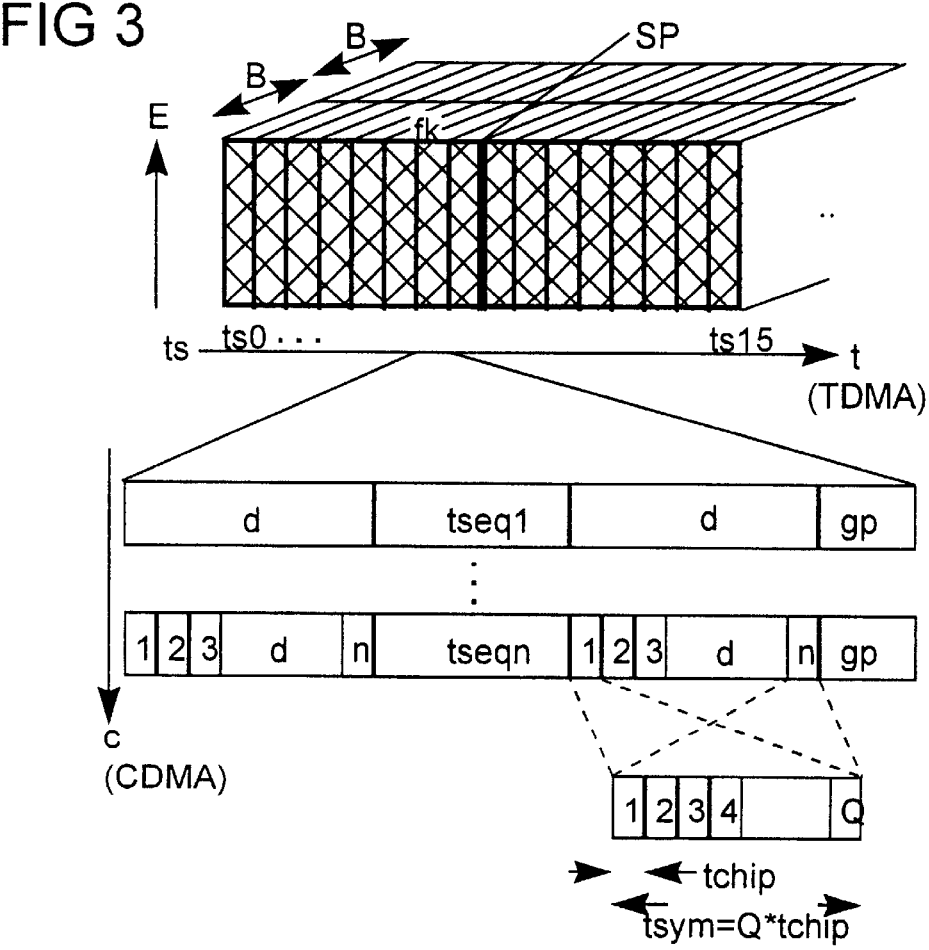
FIG. 3 is a diagrammatic, perspective illustration of an example of a frame structure of the radio interface for a TD/CDMA subscriber separation method, and of the formation of a radio block.

FIG. 3 shows an example of a frame structure of the radio interface, as is used, inter alia, in a future, third generation, mobile radio system UMTS (Universal Mobile Telecommunications System). A broadband frequency band, for example with a bandwidth of B=5 MHz, is split in accordance with a TDMA component into a plurality of time slots ts, for example 16 time slots ts0 to ts15. Each time slot ts within the frequency band B forms a frequency channel fk. Within a broadband frequency band B, the successive time slots ts are broken down in accordance with a frame structure. Thus, 16 time slots ts0 to ts15 are combined to form a frame.

When a TDD transmission method is used, some of the time slots ts0 to ts15 are used in an uplink direction, and some of the time slots ts0 to ts15 are used in a downlink direction, with the transmission in the uplink direction taking place, for example, before the transmission in the downlink direction. In between, there is a switching point SP, which can be positioned flexibly depending on the respective requirement for transmission channels in the uplink and downlink directions. In this case, a frequency channel fk for the uplink direction corresponds to the frequency channel fk for the downlink direction. The other frequency channels fk are structured in the same way.

As was described with reference to FIG. 2, information from a plurality of calls is transmitted in radio blocks within the frequency channels fk. These radio blocks include sections with data d, in each of which sections are embedded having training sequences tseq1 to tseqn that are known at the receiving end. The data d are spread on a call-specific basis with a fine structure, a spread code c (CDMA code), so that, for example, n links can be separated by this CDMA component at the receiving end. The combination of a frequency channel fk and a spread code c defines a physical transmission channel, which can be used to transmit signaling and wanted information.

The spreading of individual symbols in the data d with Q chips results in Q subsections of duration tchip being transmitted within a symbol duration tsym. The Q chips in this case form the individual spread code c. A guard time gp is furthermore provided within the time slot ts, in order to compensate for different signal propagation times for the calls in successive time slots ts.

The method according to the invention can also be used, for example, for a known CDMA subscriber separation method, in which a physical transmission channel is defined by a frequency band B and a CDMA code, and wanted and signaling information are transmitted continuously.

FIG. 4 and FIG. 5 show examples of flowcharts for the method according to the invention in the base station BS. The various functions are carried out in the control device ST, although a second reception strength rxlevUL can also be determined, for example, in the transmitting/receiving device SEE. The respective sequences are based on the second signal sig2, which is received from the antenna device and the transmitting/receiving device SEE in the base station BS, and the first reception strength rxlevDL.

In the flowchart in FIG. 4, the second signal sig2 and the first reception strength rxlevDL determined by the radio station MS are fed through the reception path of the transmitting/receiving device SEE to the control device ST in the base station BS. The control device ST uses the second signal sig2 to determine the second reception strength rxlevUL. A second difference value pathlossUL between a second transmission power level txpwrUL and the second reception strength rxlevUL is then calculated. The second transmission power level txpwrUL, which the radio station MS uses to transmit the second signal sig2 is, according to the explanations relating to transmission power regulation in the GSM mobile radio system, a priori known in the base station BS. The control device ST calculates a first difference value pathlossDL parallel to the determination of the second difference value pathlossUL. The first difference value pathlossDL is determined as a difference between a first transmission power level txpwrDL, with which the base station BS transmits the first signal sig1 to the radio station MS, and the second reception strength rxlevDL determined by the radio station MS. The difference values pathlossDL, pathlossUL respectively indicate, for example, an attenuation experienced by the first signal sig1 and the second signal sig2 during transmission through the radio interface.

An absolute magnitude of a difference diffpathloss between the determined difference values pathlossDL, pathlossUL is determined in a following step. The difference diffpathloss is then compared with an upper threshold value tpathlossmax, which is indicated as an example. Corresponding to the difference values pathlossDL, pathlossUL and the difference diffpathloss, the upper threshold value tpathlossmax may correspond to a specific dB value for a typical maximum attenuation difference between the downlink direction from the base station BS to the radio station MS and the uplink direction between the radio station MS and the base station BS. If the upper threshold value tpathlossmax is exceeded, an alarm signal is generated which indicates a defect in the transmission or reception path of the transmitting/receiving device SEE. The alarm signal may, for example, be transmitted to the operation and maintenance center OMC of the mobile radio system, in which the function of the reception paths of all of the base stations BS connected to the mobile switching center MSC is monitored centrally.

According to a non-illustrated refinement of the invention, the difference diffpathloss can also be compared with a plurality of threshold values in which case, for example, only a warning signal is generated if a first threshold value is exceeded, indicating an increased difference diffpathloss, which is not consistent with normal operation. If this situation occurs only once, then the operator can assume that no malfunction is present, thus advantageously avoiding false alarms.

The flowchart in FIG. 5 is based on that in FIG. 4 and shows average values avgpathlossDL, avgpathlossUL from the first difference value pathlossDL and the second difference value pathlossUL within a predetermined time interval t. In this case, for example, the difference values pathlossDL, pathlossUL are determined, in each case, in all of the time slots in a time frame, that is to say for all of the calls, and the time interval t may correspond to one or more time frames. A determination of the average values avgpathlossDL, avgpathlossUL normalizes brief or call-specific disturbances, and thus avoids false alarms. A start of the time interval t is stimulated by a timer T in the base station BS, and the duration of the time interval t can be administered, for example, in the already mentioned operation and maintenance center OMC. For example, the respective threshold values may also be administered in this operation and maintenance center OMC.

After determining the average values avgpathlossDL, avgpathlossUL, the difference diffpathloss is calculated, without the absolute value of the difference diffpathloss being determined in this case. The difference diffpathloss is compared with the upper threshold value tpathlossmax and a lower threshold value tpathlossmin. If, on one hand, the difference diffpathloss is greater than the upper threshold value tpathlossmax then the reception path is identified as being defective, and an appropriate alarm signal is generated. If, on the other hand, the difference diffpathloss is less than the lower threshold value tpathlossmin, then an alarm signal is generated which identifies the transmission path of the transmitting/receiving device SEE as being defective.

The above-described functional testing of the transmission/reception path of the transmitting/receiving device SEE can be carried out on the basis of the fact that a base station BS in a GSM mobile radio system generally has a large number of transmitting/receiving devices SEE for different frequencies, for example on a call basis in one or more time slots of a time frame. If a frequency hopping method is additionally used in order to improve the transmission quality, then it may be necessary to wait for a hopping sequence for evaluation for the signals of the respective call to be processed once again by the same transmitting/receiving device SEE.

We claim:

1. In a method for functional testing of a transmitting/receiving device within a base station of a radio communications system, the improvement which comprises:

providing at least one transmitting/receiving device within the base station for transmitting and receiving signals through a radio interface to and from a radio station;

transmitting a first signal at a first transmission power level from the base station to the radio station, determining a first reception strength of the first signal within the radio station, and calculating a first difference value between the first transmission power level and the first reception strength;

transmitting a second signal at a second transmission power level from the radio station to the base station, determining a second reception strength of the second signal in the base station, and calculating a second difference value between the second transmission power level and the second reception strength;

comparing any difference between the first difference value and the second difference value with at least one threshold value;

deriving a function of the transmitting/receiving device located within the base station from the comparison; and generating an alarm signal in the event of a malfunction of the transmitting/receiving device.

2. The method according to claim 1, which further comprises calculating an absolute magnitude of the difference and comparing the absolute magnitude with the at least one threshold value.

3. The method according to claim 1, which further comprises comparing the difference with an upper threshold value and with a lower threshold value, and deriving a respective function of the transmission or reception path from the comparison.

4. The method according to claim 3, which further comprises generating an alarm signal indicating a malfunction of the transmission or reception path in each case if the upper threshold value is overshot or the lower threshold value is undershot.

5. The method according to claim 1, which further comprises determining average values of the difference values over a predetermined time interval, and determining a difference between the average values.

6. The method according to claim 1, which further comprises carrying out subscriber separation in the radio communications system, using a TDMA subscriber separation method.

7. The method according to claim 1, which further comprises carrying out subscriber separation in the radio communications system, using a CDMA subscriber separation method.

8. A base station of a radio communications system, comprising:

a transmitting/receiving device:
for transmitting a first signal at a first transmission power level to a radio station through a radio interface, and
for receiving a second signal transmitted by the radio station at a specific second transmission power level; and a control device:
for determining a second reception strength of the received second signal,
for calculating a first difference value between the first transmission power level and a first reception strength determined within the radio station, and for calculating a second difference value between the second transmission power level and the second reception strength,
for comparing a difference between the first difference value and the second difference value with at least one threshold value,
for deriving a function of said transmitting/receiving device within the base station from the comparison, and
for generating an alarm in the event of a malfunction of said transmitting/receiving device.

9. The base station according to claim 8, including a timer for periodically stimulating the determination of the difference values at a predetermined time interval.

10. A mobile radio system, comprising the base station according to claim 8.

11. A wire-free subscriber access system, comprising the base station according to claim 8.

* * * * *